United States Patent [19]

Merrill

[11] 4,085,084
[45] Apr. 18, 1978

[54] SILICONE RESINS HAVING GOOD THERMAL STABILITY

[75] Inventor: Duane F. Merrill, Ballston Spa, N.Y.

[73] Assignee: General Electric Company, Waterford, N.Y.

[21] Appl. No.: 717,973

[22] Filed: Aug. 26, 1976

[51] Int. Cl.$^2$ ............................................. C08K 5/01
[52] U.S. Cl. ........................... 260/33.6 SB; 260/18 S; 260/37 SB; 260/46.5 R; 260/824 R; 260/825
[58] Field of Search .............. 260/46.5 R, 824 R, 825, 260/18 S, 37 SB, 33.6 SB

[56] References Cited

U.S. PATENT DOCUMENTS

| | | | |
|---|---|---|---|
| 3,375,223 | 3/1968 | Merrill | 260/46.5 R |
| 3,489,782 | 1/1970 | Pruvost et al. | 260/46.5 R |
| 3,865,766 | 2/1975 | Merrill | 260/46.5 R |

Primary Examiner—Melvyn I. Marquis
Attorney, Agent, or Firm—E. Philip Koltos; John L. Young; Frank L. Neuhauser

[57] ABSTRACT

A process for producing a silicone resin composed solely of difunctional siloxy units comprising hydrolyzing a diorganodihalosilane in a heterogeneous hydrolysis mixture having therein water, acetone, a water-immiscible organic solvent and optionally, an alcohol; wherein said hydrolysis must take place within ten minutes, and separating the water layer from the water-immiscible solvent silicone resin layer.

The silicone resin is further purified and bodied in subsequent process steps. There is also provided by the present invention a silicone resin mixture composed of the above difunctional silicone resin and a silicone resin composed of trifunctional siloxy units and difunctional siloxy units which silicone resin mixture has good thermal stability at temperatures up to 700° F.

18 Claims, No Drawings

SILICONE RESINS HAVING GOOD THERMAL STABILITY

BACKGROUND OF THE INVENTION

The present invention relates to a silicone resin and a process for producing a silicone resin, which resin is composed solely of difunctional siloxy units and more specifically, the present invention relates to silicone resins composed solely of difunctional siloxy units which can be mixed with other silicone resins to produce a silicone resin mixture with optimum thermal stability properties.

Silicone resins having good thermal stability are well-known, for instance see the disclosure in Merrill patent application, Ser. No. 628,001, entitled Fast Curing Silanol-Containing Organopolysiloxane Resins and a Method for Making Them.

Most of such silicone resins are stable only at temperatures as high as 600° F. At the 700° F temperature level such resins are rarely thermally stable for prolonged periods of time. Accordingly, it is highly desirable to produce a silicone resin or a silicone resin mixture which would have as high a thermal stability as possible and specifically have a good thermal stability at 700° F.

As pointed out previously, standard silicone resins were only occasionally thermally stable at such high temperatures as 700° F for any measurable period of time. It should also be pointed out, that it was desirable that silicone resins be thermally stable, that is, that they would not crack or craze at temperatures as high as 700° F or above since such silicone resins are preferred ingredients for producing electrical junction coatings, electrical encapsulating compositions, silicone paints which are to be utilized to coat electrical components and for producing electrical varnishes.

In a different vein, all silicone resins that have been produced up to the present time have been composed solely of trifunctional siloxy units or of trifunctional siloxy units and difunctional siloxy units, that is they were produced by the hydrolysis of monoorganotrichlorosilane and diorganodichlorosilane to produce a silicone resin where the organo to Si ratio may vary anywhere from 1.1 to 1.9:1.

As pointed out above it has also been possible up to the present time to produce silicone resins composed solely of trifunctional siloxy units and such silicone resins are highly desirable in many applications, including the encapsulation of electrical components. However, most silicone resins were formulated with a certain amount of difunctional siloxy units in them, since silicone resins composed solely of trifunctional siloxy units are very brittle. Accordingly, the difficulty with such solely trifunctional silicone resins or silicone resins which had no difunctional siloxy units in them was that such resins tended to be brittle and as such would shatter upon being struck a sharp blow by some object.

Accordingly, silicone resins for most applications were formulated with a certain amount of difunctional siloxy units in them by hydrolyzing a mixture of the appropriate amount of trihalosilanes with dihalosilanes so as to obtain the desired organo to Si ratio desired in the final silicone resin product.

However, such formulations created certain problems with respect to formulators of silicone resins which utilize silicone resins to produce other products, such as silicone paints. Thus, such formulators or producers of silicone paints would obtain a silicone resin from a silicone manufacturer having a certain organo to Si ratio and the formulators would attempt to formulate a silicone paint having a certain rigidity and flexibility in it.

It can be appreciated, as stated above that the formulator was restricted in his freedom in formulating his particular composition since the properties of the silicone resin sold to him by the silicone manufacturer were fixed and specifically the organo group to Si ratio in the resin was fixed. All the formulator could do previously would be to specify a silicone resin for his use with a certain organo group to Si ratio. Once he had received the resin from the manufacturer he could not change this ratio.

Accordingly, it was highly desirable to obtain a silicone resin composed solely of difunctional siloxy units. That is a true silicone resin and not a fluid which silicone fluids have been produced by previous processes that attempted to produce an all difunctional silicone resin. Accordingly, a formulator of silicone paints, electrical varnishes, and electrical encapsulating compositions, junction coatings and what not, if he had an all difunctional silicone resin, he could take one of the standard silicone resin products that are currently on the market and by adding the appropriate amounts of the solely difunctional silicone resin to the standard products could formulate a silicone resin mixture that had the optimum properties for his particular application.

It can be appreciated that the addition of an all difunctional silicone resin to a standard silicone resin product would be highly desirable if such addition would not take away from the thermal stability of the standard product silicone resin, and if such silicone resin would be compatible with such standard silicone resin product and would impart to such standard silicone resin product the desired amount of plasticity that is desired for a silicone resin varnish or paint.

Accordingly, it is one object of the present invention to provide for an all difunctional silicone resin and a process for producing an all difunctional silicone resin.

It is another object of the present invention to provide for an all difunctional silicone resin with good thermal stability.

It is an additional object of the present invention to provide for a silicone resin mixture and a process for forming a silicone resin mixture, which mixture is composed of an all difunctional silicone resin and a silicone resin composed of trifunctional siloxy units and difunctional siloxy units where the resulting silicone resin mixture has good thermal stability at excessively high temperatures.

These and other objects of the present invention are accomplished by means of the disclosure set herein below.

SUMMARY OF THE INVENTION

There is provided by the present invention an all difunctional silicone resin having good thermal stability prepared by a process comprising hydrolyzing a diorganodihalosilane in a heterogeneous hydrolysis mixture having therein from about 1.7 parts to about 10 parts by weight of water per part of silane; from about 0.2 to about 5 parts by weight of acetone per part of silane; from about 0.3 to about 5 parts by weight of water-immiscible organic solvent per part of silane and from 0 to about 1 mole of an aliphatic monohydric alcohol having from 1 to 8 carbon atoms per mole of halogen attached to the silicone atom of said silane wherein said hydrolysis must take place within ten minutes and then separating the water layer from the organic solvent layer which contains the resin wherein said organic groups of said diorganodihalosilanes are selected from the class consisting of methyl and phenyl and the halogen is chlorine, and wherein in said organo groups said methyl concentration varies from 40 to 60 mole percent of the total organic groups in the halosilanes.

An electrical encapsulating composition is prepared with the above silicone resin by curing it by itself or with a concentration of 0.05 to 2 percent by weight of the total silicone resin of a curing catalyst which is the metal salt of a carboxylic acid where the metal is selected from the class consisting of lead to manganese in the periodic table.

There is also provided by the present invention, a silicone resin mixture with good thermal stability up to 700° F for a substantial period of time comprising mixing the first silicone resin which is composed of a first silicone resin which is the all difunctional silicone resin prepared by the process set forth herein above, and a second silicone resin produced by hydrolyzing an organohalosilane in a heterogeneous hydrolysis mixture composed of from about 1.7 parts to about 10 parts by weight of water per part of halosilane; from about 0.2 to about 5 parts by weight of acetone per part of halosilane; from about 0.3 to about 5 parts by weight of a water-immiscible organic solvent per part of said halosilane; and optionally, from 0 to about 1 mole of an aliphatic monohydric alcohol having from 1 to 8 carbon atoms per mole of halogen attached to the silicone resin in the organic solvent layer from the acid/water layer where said organohalosilanes consist of methyltrichlorosilane and phenyltrichlorosilane where the concentration of the methyltrichlorosilane in the total trichlorosilanes varies from 20 to 80 mole percent and further consists of dimethylchlorosilane and diphenylchlorosilane where the concentration of the dimethylchlorosilane varies from 20 to 80 mole percent in the total dichlorosilanes.

It is preferred that in the silicone resin mixture of the above that said first silicone resin be present at a concentration that varies from 30 to 70 percent by weight based on the total silicone resin concentration.

The silicone resin mixture of the above or a total difunctional silicone resin may be utilized advantageously in such applications as electrical encapsulating compositions, electrical junction coatings, silicone paints and electrical varnishes. The silicone resin mixture of the above has the advantage that even though the individual silicone resins by themselves have good thermal stability up to temperatures of 600° F, that is, they will not crack or craze, the advantage of the silicone resin mixture is that it has a good thermal stability up to temperatures of 700° F for prolonged periods of time without cracking or crazing, such prolonged periods of time being in the neighborhood of 30 minutes to 60 minutes.

The preferred concentrations of mixtures of the first silicone resin with the second silicone resin can be anywhere in the 30 to 70 percent by weight range of the first silicone resin based on the total silicone resin mixture. The most preferred concentration is where the first silicone resin is present in a concentration of 30 percent to 50 percent by weight of the total silicone resin mixture. As stated previously, both the difunctional siloxy silicone resin as well as the silicone resin mixture composed of the first silicone resin and the second silicone resin can be cured either without a catalyst by the application of heat or can be cured more rapidly by the presence of a catalyst at a concentration of 0.05 to 2 percent by weight of the total silicone resin mixture which catalyst is a metal salt of a monocarboxylic acid or the metal salt of a dicarboxlic acid where the metal varies from lead to manganese in the periodic table.

DESCRIPTION OF THE PREFERRED EMBODIMENT

In the process for producing wholly difunctional silicone resins there can, of course, only be utilized a diorganodihalosilane as a reactant, preferably, the halo groups are chlorine, since the chlorosilanes are the most readily available halogenated silanes. The organo groups are preferably selected from methyl and phenyl basically because the invention of the instant case in producing a silicone resin instead of a fluid has only up to this time been demonstrated by applicant only with a halosilane reactant containing only methyl and phenyl substituent groups. More preferably in the diorganodichlorosilane, which is utilized as a reactant, the concentration of methyl to phenyl should be in the range of 40 to 60 mole percent of methyl and based on the total organic groups in the diorganodichlorosilane. However, it may be possible in the future to demonstrate production of a solely difunctional silicone resin where other organic groups may be utilized. Such a resin is produced by hydrolyzing the diorganodichlorosilane in a heterogeneous hydrolysis mixture having therein from about 1.7 parts to about 10 parts by weight of water per part of silane; from 0.2 to about 5 parts by weight of acetone per part of silane and from about 0.3 to about 5 parts by weight of a water-immiscible organic solvent per part of silane. It is preferred that the silicone resin product not contain alkoxy groups; however, if it is desired to have a certain amount of alkoxy substituents in the sole difunctional silicone resin, there may be reacted an alkoxylated diorganochlorosilane, that is, where some of the chlorine groups are substituted by alkoxy groups, or where all chlorine groups moieties are substituted by alkoxy groups or they may be added to the heterogeneous hydrolysis mixture from about 0 to about 1 mole of an aliphatic monohydric alcohol having from 1 to 8 carbon atoms per mole of halogen attached to the silicone atom of said chlorosilane.

As stated previously, such alkoxy groups are not desirable in the instant difunctional silicone resin. However, such groups may be present in the final silicone resin if alkoxy groups are desired for some reason such as, for instance, solubility of the instant difunctional silicone resin in certain organic solvents. It should be noted that with the above hydrolysis ingredients that the hydrolysis medium is heterogeneous, that is, there are two phases a water phase and a water-immiscible organic solvent phase. The water-immiscible organic solvent may be selected from any of the well-known organic solvents in which silanes are soluble such as for example xylene, toluene, benzene, chlorinated hydrocarbon solvents, heptane, octane and cyclohexane to give a few as an example. It is imperative that during the addition of the diorganodihalosilane that said addition take place within ten minutes if there is to be produced a true silicone resin instead of a difunctional silicone fluid. It is desirable that the temperature of hydrolysis be regulated within the temperature ranges of 20° C to 70° C. It is desirable that the temperature of hydrolysis does not increase over 80° C since the pouring of the diorganodichlorosilanes in the heterogeneous hydrolysis mixture over a short period of time at high temperatures will not only result in evaporation of some of the chlorosilanes, but might also result in the gelling of the silicone resin as it is formed.

Accordingly, it is preferred that the diorganodichlorosilanes be added with constant agitation to the heterogeneous hydrolysis mixture and that this be done with complete addition taking place within ten minutes. Preferably, the temperature of the heterogeneous hydrolysis media should be maintained between 20° C to 40° C and preferably as close to 20° C as possible.

After complete addition of the diorganodihalosilane has taken place, it is necessary to properly agitate the mixture for about 30 minutes to 1 hour just to insure complete hydrolysis of the diorganodichlorosilane. At the end of that period, that is, the water/acid phase, the water phase containing the hydrochloric acid that is formed during hydrolysis is then separated and there is left the silicone resin of the instant invention dissolved in the water-immiscible organic solvent.

It is only necessary at this point to further body the resin to stabilize it and also remove acid impurities that would tend to degrade it during its application for various purposes.

Accordingly, at this point it is further desirable to heat said silicone resin organic solvent layer to a temperature of 120° C to 140° C for 30 minutes to 3 hours so as to remove solvent and excess acid.

At this point, after this heating step has been accomplished, and in which most of the excess acid has been removed from the silicone resin, then it is necessary to body the silicone resin to increase its viscosity so it can be utilized, for instance as an electrical encapsulating composition or in an electrical varnish. Such bodying step is accomplished by adding an acid catalyst to said silicone resin solvent layer and adding solvent as needed so as to keep the resin dissolved in the solvent and such that the solvent can be refluxed to further body the silicone resin.

Accordingly, after such acid catalyst is added, which in this case should be an acid catalyst of medium activity such as an acid activated clay such as the Filtrols, sold by Filtrol Corporation, Los Angeles, CA. Such acid activated clays are usually sulfuric acid activated clays and are well-known in the chemical arts.

Accordingly, after the addition of this catalyst which may be at a concentration of anywhere from 0.5 to 5 percent by weight of the silicone resin such organic solvent silicone resin solution, containing the acid activated clay is heated at a temperature in the range of 140° C to 160° C for a period of time of 1 hour to 8 hours to remove solvent, but more importantly to body the silicone resin, that is, such that the bodied silicone resin contain silanol groups in the range of 2 to 4 percent by weight.

It should also be appreciated that the initial heating of the silicone resin organic solvent solution and in the subsequent bodying that the temperature ranges are not critical in the instant process.

What has been disclosed above is the preferred heating ranges wherein the above steps are accomplished. Heating above 140° C in the bodying step may well be carried out at temperatures up to, for instance, 200° C the only limitation being that during the bodying step it is desired to remove only minor amounts of solvent over a long period of time so as to accomplish the necessary bodying of the silicone resin without evaporating all the solvent in the process. Such is true also in the initial heating step wherein there is disclosed the preferred heating range for removing the hydrochloric acid that is formed during hydrolysis.

In the first heating step, it is only necessary to heat the silicone resin to remove excess acid from the organic solvent silicone resin solution that is separated subsequent to hydrolysis. A temperature that is slightly above the refluxing temperature of the organic solvent is suitable for this heating step. It is only necessary to heat the solvent layer to remove the excess acid and some of the organic solvent will of course be distilled off in the process. The second heating step is for the purpose of bodying the resin.

At this point in the process, it is only necessary, that is, when there is present a bodied silicone resin which is composed solely of difunctional siloxy groups having a silanol content of 2 to 4 percent by weight, to reduce the acid content of the resin to below 10 parts per million. This may be done with a neutralizing agent such as, for instance, ammonia. However, it is often not desirable to add neutralizing agents to reduce the acid content in silicone resins. A preferred method for reducing the acid content of silicone resins is simply to filter the silicone resin through a basic filter medium and thus reduce its acid content to the desired level without the formation of salts.

Accordingly, preferably, the silicone resin composed solely of difunctional siloxy units is preferably filtered through a diatomaceous earth to result in a silicone resin in solution having an acid content of less than 10 parts per million. It is desirable that the acid content of the silicone resin be reduced to less than 10 parts per million since if the acid content is above this level the acid will tend to degrade the silicone resin over a long period of time. It is not desirable to neutralize the silicone resin with the use of strong basic agents since the formation of the salts which result, might deleteriously affect or limit the application of the silicone resin in its subsequent use in silicone paints or electrical encapsulating compositions. In this respect there is the problem that the salts which are formed during the neutralization procedure might interreact with any catalyst that might be added to such silicone resins during the curing of the silicone resins in subsequent formulations such as electrical varnishes and electrical encapsulating compositions.

After the acid content of the silicone resin has been reduced to below 10 parts per million and preferably below 5 parts per million, it is only necessary to adjust the silicone resin to the desired solids content which may be anywhere in the area from 50 to 90 percent by the simple addition or removal of the necessary amounts of water-immiscible organic solvent. If all the solvent is removed and the silicone resin is formed at 100% solids, it is found that if the steps of the above process are followed there is obtained a resinous material at 100% solids rather than an oil which was the case with prior processes. Such resin when dissolved at 70% solids for instance, in a water-immiscible solvent such as toluene and without catalysts can be utilized as electrical encapsulating compositions and as electrical varnishes with good results. It can be cured upon heating in the absence of a catalyst or it can be cured with the presence of a catalyst with or without heat to produce electrical encapsulating compositions and an electrical impregnating varnish which has a thermal stability at temperatures of to 600° F. The catalyst that can be utilized with such a silicone resin to cure it in certain applications are well-known for instance they can be cured with the metal salts of monocarboxylic and dicarboxylic acids where the metal is selected from lead to manganese in the periodic table. The amount of catalyst can vary, but generally it is preferred that the catalyst be present in a concentration of .05 to 2 percent by weight of the total silicone resin as stated previously. The above silicone resin can also be utilized in silicone polyester paints where there is present a polyester and 5 to 30 percent by weight of the polyester of the above sole difunctional silicone resin, a pigment, a catalyst, the usual solvents and any other optional additives. It should be noted that such a silicone resin may be mixed with standard silicone resins most of which are compatible with it; that is, silicone resins composed of trifunctional and difunctional siloxy units to regulate or adjust plasticity of such silicone resins. This results in silicone resin coatings which are more shock resistant and less brittle.

The silicone resin of the instant invention composed of solely difunctional units also has other uses not envisioned at the present time where such a resin may be utilized as an additive for the purpose of improving the brittleness of other silicone resin products and silicone materials.

It has been found that there is a preferred silicone resin that combined with the above difunctional silicone resin in the proportions stated above, results in a silicone resin mixture with improved thermal stability at temperatures up to 700° F for prolonged periods of time such as 30 minutes to 1 hour. Thus, there is also provided by the present invention a silicone resin mixture composed of the first silicone resin which is the above sole difunctional silicone resin combined with a second silicone resin, which second silicone resin is produced by hydrolyzing an organohalosilane in a heterogeneous hydrolysis mixture composed of, as in the previous case, from about 1.7 parts to about 10 parts by weight of water per part of halosilane; from about 0.2 to about 5 parts by weight of acetone per per part of halosilane; from about 0.3 to about 5 parts by weight of water-immiscible organic solvents per part of halosilane and optionally from 0 to about 1 mole of an aliphatic monohydric alcohol having from 1 to 8 carbon atoms per mole of halogen attached to the silicone atom of said halosilane.

As stated previously with the sole difunctional silicone resin that the second silicon resin preferably does not contain alkoxy groups, if it is desired that it contain alkoxy groups, then instead of an organohalosilane as a reactant, there by be utilized an all alkoxylated or partially alkoxylated organosilane as a reactant. Or, optionally, an alcohol may be added to the heterogeneous hydrolysis mixture again, as in the previous process. The hydrolysis medium in the instant case must be heterogeneous that is, there must be a water layer and an organic solvent water-immiscible layer.

It should also be noted, that in the instant process as in the previous process the organohalosilanes or organoalkoxysilanes may be added in any fashion, that is, they may be added by themselves, they may be added dissolved in some of the water-immiscible organic solvent to the heterogeneous hydrolysis mixture or they may be added concurrently, dissolved or undissolved, in a water-immiscible organic solvent concurrently with the additon of part of the acetone. Such addition procedures are set forth in the prior Merrill case, referred to previously.

In this second hydrolysis, the time of addition of the organohalosilane to the heterogeneous hydrolysis mixture is optional and preferably taking place in a period of time varying from 30 minutes to 1 hour. It is only necessary as before that the heterogeneous hydrolysis medium be maintained in the temperature range of 20° C to 80° C and more preferably in the temperature range of 20° C to 40° C. Of course the organohalosilanes are added with agitation. The water-immiscible organic solvent may be any of the water-immiscible organic solvents disclosed for the previous process such as toluene, xylene and so forth. It is also necessary during the addition of the organo halosilanes to the heterogeneous hydrolysis medium and for 30 minutes to 1 hour thereafter the total addition takes place, that the heterogeneous hydrolysis medium be continually agitated to assure proper interreaction of the halosilanes and to prevent possible gelling of the silicone resin as it is formed.

It should be pointed out that the use of alcohol in both of these reactions is solely for the purpose of providing alkoxy groups in the final silicone resin product. It is not for the purpose of affecting the hydrolysis reaction. It is preferred in the instant processes that alcohol be not utilized and that the final silicone resin product for maximum thermal stability be free from alkoxy groups.

In the instant case, the organohalosilane is preferably composed of methyltrichlorosilane and phenyltrichlorosilane where the concentration of the methyl group in the total trichlorosilanes varies from 20 to 80 mole percent. Also, the organohalosilane reactant further consists of dimethyldihalosilane and diphenyldihalosilane where the concentration of the total dimethyl groups in the diorganodihalosilane varies again from 20 to 80 mole percent. The instant silicone resin product must contain methyltrifunctional siloxy units, phenyltrifunctional siloxy units, dimethyldifunctional siloxy units and diphenyldifunctional siloxy units, where in the appropriate trifunctional and difunctional siloxy units the methyl content varies as indicated above. It is desired that the methyl and phenyl concentration be in the above ranges as indicated above since it has been found that the novel silicone resin mixture of the instant case with exceptionally high thermal stability is only obtained when a silicone resin within the above limitation is utilized. Accordingly, when such a silicone resin is utilized there results a synergistic effect in which the silicone resin mixture has enhanced thermal stability at 700° F. After the addition of the organohalosilane reactant in the above process which as stated previously may be within any time period preferably from 30 minutes to 1 hour or 1 ½ hours the heterogeneous hydrolysis mixture is continually agitated for a subsequent period to assure complete reaction. Then the water/acid phase is separated from the organic solvent silicone resin phase. The silicone resin organic solvent layer, as previously, is then heated to a temperature between 120° C and 140° C to remove some solvent, but basically for the purpose of removing excess acid which temperature of heating, again, is not critical and varies dependent upon the reflux temperature of the water-immiscible organic solvent that is utilized. At this point for the application of the silicone resin mixture, to forming varnishes and encapsulating compositions, it is desired to body the silicone resin. In this case it is not necessary to use a medium strength acid catalyst as was the case with the solely difunctional silicone resin since the resin has trifunctional siloxy units in it and is easier to body. Accordingly, there may be utilized at a concentration of 1 to 5 percent of the silicone resin, a diatomaceous earth and the resulting composition can be then heated at excessively high temperatures in the range of 190° C to 240° C to body the said silicone resin such that it has a silanol content of 2 to 4 percent which bodying process takes place in 1 to 8 hours. It should be noted during such bodying steps the temperature range, given above, is not the time of heating the resin at that temperature, but is the time of heating the resin until it reaches a temperature within the above range. This is true for the instant process and the previous process.

It should be noted also that it is desired in such bodying step that both the silicone resin of the previous process as well as the instant process be bodied such that at 70% solids the resin solution has a viscosity of between 500 to 1,000 centipoise at 25° C. This viscosity is desirable so that the silicone resin has the appropriate consistency when it is utilized at 50, 70, or 90 percent solids in electrical encapsulating compositions, in electrical junction coatings or in electrical varnishes.

It should also be noted that the silicone resin of the instant process, composed of trifunctional and difunctional siloxy units can be heated to a much higher temperature during the bodying step, since it is a more stable resin in the presence of an acid than is the case with the solely difunctional silicone resin. It is preferred that diatomaceous earth be used in the second bodying step rather than Filtrol since there is sufficient acid present because of the high amount of acid produced during the hydrolysis period as compared to the case of the sole difunctional silicone resin. Further, it should be noted that diatomaceous earth is a preferred bodying catalyst when it can be utilized since it contaminates the silicone resin product the least. However, diatomaceous earth does necessitate the use of excessively high temperatures in bodying the silicone resin, that is, heating the organic solvent silicone resin layer up to a temperature of 190° C to 240° C for 1 to 8 hours until the silicone resin is within the viscosity range and silanol content mentioned previously. In the previous situation with a solely difunctional silicone resin the silicone resin is not as stable during the bodying step and as such it is not desirable to heat it at excessively high temperatures.

After such a bodying of the second silicone resin it is only necessary to reduce the acid content of the silicone resin organic solvent solution to an acid content not exceeding 10 ppm and preferably not exceeding 5 ppm. This may be done as mentioned in the previous case by filtering the silicone resin solvent solution through a diatomaceous earth or other type of basic filtering agent. However, in accordance with the present method of bodying said second silicone resin the acid content has been reduced by heating at elevated temperatures and also by the use of diatomaceous earth during the bodying step such that the acid content is reduced to the point where a filtering step is not required. Accordingly, if the silicone resin organic solvent layer is a result of the bodying step or through a subsequent filtering step has the appropriate acid content then it may be adjusted to the desired organic solvent silicone resin solids concentration and be utilized in said silicone resin mixture with the first silicone resin mentioned above to produce silicone resin paints, silicone resin varnishes, silicone resin electrical encapsulating compositions and silicone resin junction coatings having improved and enhanced thermal stability at temperatures up to 700° F. As mentioned previously, this means that the silicone resin mixture will remain intact and will not crack or craze at this highly elevated temperature as was the case at times with prior silicone resin compositions. The second silicone resin is utilized with the first silicone resin in silicone resin solutions at concentrations of anywhere from preferably 50% solids to 90% solids. Of course, it is also envisioned that the two silicone resins may be mixed in the concentrations mentioned previously, at even 100% solids for certain applications.

With the above silicon resin mixture, composed of the first silicone resin and the second silicon resin there may be prepared silicone polyester paints, silicone resin electrical varnishes, resin encapsulating compositions, and silicone resin junction coatings in the same concentrations and with the same ingredients disclosed above for the solely difunctional silicone resin. Further, such silicone resin mixture compositions composed of the first silicone resin and the second silicone resin disclosed above may be cured with the same amounts and with the same type of catalysts as disclosed above for the solely difunctional silicone resin. However, it is not necessary for a catalyst to be utilized to cure such silicone resin mixtures since they may be cured at elevated temperatures, without a catalyst. However, a catalyst will increase the rate of cure at room temperature and will certainly increase the speed of cure of the silicone resin mixture composition when it is cured at elevated temperatures. It is found that in such applications as mentioned above, when the mixture of the above silicone resin is used, that such compositions have outstanding thermal stability at temperatures up to 700° F for a period of time varying anywhere from 30 minutes to 1 hour or more.

It can also be stated that the difunctional silicone resin disclosed above as well as the silicone resin mixture can be utilized as additives to silicone resin molding compositions. Such silicone resin molding compositions are composed of a silicone binder resin, which is a silicone resin composed of monoorganotrifunctional siloxy units and diorganodifunctional siloxy units with an organo to Si ratio that varies from 1.1 to 1.9, a catalyst which can be the various lead carbonates in combination with carboxylic acid anhydrides or acids in which there is also present a filler for instance calcium carbonate or silica and in which there is also present pigments and other optional ingredients.

In such silicone resin molding compositions the foregoing solely difunctional silicone resin may be utilized as a plasticizing additive at concentrations of 5 to 30 percent by weight based on the basic silicone binder resin. Such solely difunctional silicone resin may be added to such silicone resin molding compositions in quantities to produce the desired plasticizing effect on the finished molded product. In addition the silicone resin mixture of the instant case may be utilized as the basic silicone binder resin in silicone resin molding compositions.

All parts and percentages in the instant specification are by weight. The foregoing examples are given for the purpose of illustrating the instant invention and are not given for any purpose in terms of defining the scope of the instant claims.

EXAMPLE I

There was charged to a flask equipped with a condenser, agitator and thermometer 900 parts of acetone and 3,000 parts of water. There was added to the mixture in the reaction flask a silane blend consisting of 338 parts of dimethyldichlorosilane, 662 parts of diphenyldichlorosilane and 900 parts of toluene. The addition time was controlled for 5–10 minutes allowing the reaction temperature to rise from a starting temperature of 20°–25° C to a peak temperature of 55°–60° C. The mixture was agitated for 30 minutes following the completion of the silane addition. The agitation was stopped and the mixture was allowed to settle. The acid/water (bottom) layer was drawn off and discarded. The silane resin (top) layer was charged to a flask equipped with an agitator, condenser and thermometer. The solution was heated and the solvent removed under atmospheric conditions to 130° C. The concentrate was cooled to 80°–90° C. One percent Filtrol #1 was charged to the resin concentrate based on resin solids. The mixture was heated and the solvent was stripped off to 160° C total reflux for bodying the resin. When the desired viscosity of 500 centipoise at 25° C was reached the mixture was cooled and cut with toluene. Celite 545 was dispersed in the resin mixture and the mixture was filtered and finally adjusted to 70% solids with toluene.

When the above silane blend is hydrolyzed by prior art methods the resulting polymer is a thin oil. By this process an unusual polymer is formed. It is resinous and cures to a flexible resin film in the presence of a catalyst. Unlike silicone oils it is completely miscible with silicone resins. It has been found useful as an electronic junction coating resin and a flexible electrical impregnating varnish. The resin has good thermal stability at 300° C.

EXAMPLE II

There was charged to a reaction flask equipped with a condenser, agitator and thermometer 900 parts of acetone and 3,000 parts of water. There was added to the mixture in the reaction flask a silane blend consisting of 208 parts of methyltrichlorosilane, 294 parts of phenyltrichlorosilane, 216 parts of dimethyldichlorosilane, 282 parts of diphenyldichlorosilane and 900 parts of toluene. The addition time was controlled for 30 minutes controlling the reaction temperature below 65° C with external cooling. The mixture was agitated for 30 minutes following the completion of the silane addition. The agitation was stopped and the mixture was allowed to settle. The acid/water (bottom) layer was drawn off and discarded. The resinous (top) layer was charged to a flask equipped with an agitator, condenser and thermometer. The mixture was heated and the solvent was stripped off under atmospheric conditions to 130° C. One percent diatomaceous earth (Celite 545) was charged to the concentrate based on resin solids. The mixture was heated and the solvent was stripped off under atmospheric conditions to 200°–220° C for bodying the resin. When the desired viscosity end point of 500 centipoise at 25° C was reached the resin was cooled and cut with toluene and filtered to remove the diatomaceous earth. A final adjustment of the resin solids was made to 70% with toluene.

The above resin is stable at 600° C and has been found useful as a rigid electronic junction coating.

Resins from Examples I and II were found to be completely miscible. In testing mixtures of the two resins for modifying hardness and flexibility a totally unexpected result was obtained. The mixture had higher temperature thermal stability than the individual resins and all other prior art silicone resins.

Accordingly, to 30 parts of resin from Example II was mixed 70 parts of resin from Example I. When tested for thermal stability it was found that the resin film coated on an alumina substrate was not cracked or crazed after heat aging for 30 hours at 700° F.

Other mixtures found to have thermal stability was 50–50 and 70–30 parts of resin from Examples II and I respectively.

The original tests were conducted without the aid of a catalyst. The tests were then repeated with 5% choline octoate based on resin solids. The catalyst had no effect on the thermal stability of the resin films.

I claim:

1. A process for preparing a difunctional silicone resin having good thermal stability comprising
   a. hydrolyzing a diorganodihalosilane in a heterogeneous hydrolysis mixture having:
      1. from about 1.7 parts to about 10 parts by weight of water, per part of silane,
      2. from about 0.2 to about 5 parts by weight of acetone per part of silane
      3. from about 0.3 to about 5 parts by weight of water-immiscible organic solvent per part of silane, and
      4. from 0 to about 1 mole aliphatic monohydric alcohol having from 1 to 8 carbon atoms per mole of halogen attached to the silicone atom of said silane, wherein said hydrolysis must take place within 10 minutes and
   b. separating the water layer from the organic solvent layer which contains the resin wherein said organo groups of said diorganodihalosilane are methyl and phenyl and the halo is chlorine and in said organo groups the methyl concentration varies from 40 to 60 mole percent.

2. The process of claim 1 further comprising heating said organic solvent resin layer to 120°–140° C to remove solvent and acid, adding an acid catalyst to said resin solvent layer and heating said solvent resin layer to a temperature in the range of 140°–160° C to remove solvent until said silicone resin is bodied and has a silanol content in the range of 2 to 4 percent by weight.

3. The process of claim 2 wherein said acid catalyst is acid activated clay.

4. The process of claim 3 further comprising neutralizing aid bodied silicone resin so that it has an acid content that does not exceed 10 ppm.

5. A silicone resin produced by the process of claim 1.

6. A silicone resin produced by the process of claim 4.

7. An electrical encapsulating composition produced with the silane resin of claim 1 into which is mixed 0.05 to 2% by weight of the silicone resin as a curing catalyst the metal salt of a carboxylic acid wherein the metal is selected from the class consisting of from lead to manganese in the periodic table.

8. An electrical varnish produced from the silicone resin of claim 1 into which there is added an organic solvent and 0.05 to 2% by weight of the silicone resin of a curing catalyst which is the metal salt of a carboxylic acid where the metal is selected from the class consisting of lead to manganese in the period table.

9. A silicone paint produced by mixing a polyester, the silicone resin produced by the process of claim 1 at a concentration of 5 to 30% by weight of the polyester, a pigment and 0.05 to 2% by weight of said silicone resin of a curing catalyst.

10. A silicone resin mixture with thermal stability up to 700° F comprising mixing a first silicone resin which is the silicone resin produced by the process of claim 1 with a second silicone resin produced by (a) hydrolyzing an organohalosilane in an heterogeneous hydrolysis mixture composed of:
1. from about 1.7 parts to about 10 parts by weight of water per part of halosilane,
2. from about 0.2 to about 5 parts by weight of acetone per part of halosilane,
3. from about 0.3 to about 5 parts by weight of a water-immiscible organic solvent, per part of halosilane, and
4. from 0 to about 1 mole of an aliphatic monohydric alcohol having from 1 to 8 carbon atoms, per mole of halogen attached to the silicone atom of said halosilane, and (b) separating the second silicone resin organic solvent layer from the acid/water layer where said organohalosilane consists of methyltrichlorosilane and phenyltrichlorosilane where the concentration of the methyltrichlorosilane in the total trichlorosilane varies from 20 to 80 mole percent and further consists of dimethylchlorosilane and diphenylchlorosilane where the concentration of dimethylchlorosilanes varies from 20 to 80 mole percent in the total dichlorosilanes.

11. The silicone resin mixture of claim 10 wherein said first silicone resin is present at a concentration that varies from 30 to 70 percent by weight based on the total silicone resin concentration.

12. The silicone resin mixture of claim 10 wherein said process for said second silicone resin further comprises heating the second silicone resin organic solvent layer to 120°-140° C to remove solvent adding diatomaceous earth to said second silicone resin and organic solvent and heating to a temperature in the range of 190°-240° C to remove solvent and water and to body said silicone resin until it has a silanol content of 2 to 4% by weight and finally neutralizing said second silicone resin until it has an acid content that does not exceed 10 ppm.

13. The silicone resin mixture of claim 12 wherein said silicone resin mixture is at 50-90% by weight solids content in an organic solvent selected from the class consisting of xylene, toluene, benzene, cyclohexane, heptane and octane.

14. The process of claim 1 wherein said water-immiscible organic solvent is selected from the class consisting of xylene, toluene, benzene, cyclohexane, heptane and octane.

15. The silicone resin mixture of claim 10 wherein the process in making said second silicone resin said water-immiscible organic solvent is selected from the class consisting of xylene, toluene, benzene, cyclohexane, heptane and octane.

16. The silicone resin mixture of claim 12 which may be utilized as an electrical encapsulating resin mixture by further comprising having therein as a curing catalyst 0.05 to 2% by weight of a metal salt of a carboxylic acid where the metal is selected from lead to manganese in the periodic table.

17. The silicone resin mixture of claim 13 which may be utilized as an electrical varnish by further comprising having therein as a curing catalyst 0.05 to 2% by weight of a metal salt of a carboxylic acid wherein the metal is selected from lead to manganese in the periodic table.

18. The silicone resin mixture of claim 12 which may be utilized as an silicone paint by further conprising having therein a 5 to 30% by weight of a polyester of said silicone resin mixture and 0.05 to 2% by weight of said silicone resin mixture of a metal salt of a carboxylic acid where the metal is selected from lead to manganese in the periodic table.

* * * * *